United States Patent [19]

Lefebvre

[11] Patent Number: 4,781,837
[45] Date of Patent: Nov. 1, 1988

[54] METHOD OF PERFORMING OSMETIC DISTILLATION

[75] Inventor: Michel S. M. Lefebvre, Point Piper, Australia

[73] Assignee: Limitinstant Limited, London, England

[21] Appl. No.: 900,156

[22] PCT Filed: Nov. 21, 1985

[86] PCT No.: PCT/AU85/00287

§ 371 Date: Jul. 21, 1986

§ 102(e) Date: Jul. 21, 1986

[87] PCT Pub. No.: WO86/03135

PCT Pub. Date: Jun. 5, 1986

[30] Foreign Application Priority Data

Nov. 21, 1984 [AU] Australia .............................. PG8224

[51] Int. Cl.$^4$ ............................................. B01D 13/01
[52] U.S. Cl. ............................ 210/640; 159/DIG. 27; 203/10; 203/DIG. 17; 210/641; 210/642; 210/648; 210/195.2; 210/321.78
[58] Field of Search ............... 210/640, 641, 642, 644, 210/648, 195.2, 321.1, 258, 433.2; 55/158; 203/10, 11, 99, DIG. 17; 202/173, 174, 236, 266; 159/17 R, DIG. 27

[56] References Cited

U.S. PATENT DOCUMENTS

| 2,984,623 | 5/1961 | Lee | 210/640 |
| 3,340,186 | 9/1967 | Weyl | 210/642 X |
| 3,342,729 | 9/1967 | Strand | 210/641 X |
| 3,405,058 | 10/1968 | Miller | 210/640 |
| 4,476,024 | 10/1984 | Cheng | 210/640 X |
| 4,545,862 | 10/1985 | Gore et al. | 210/640 X |
| 4,581,236 | 4/1986 | Bandel et al. | 210/648 X |

FOREIGN PATENT DOCUMENTS

| 255558 | 5/1963 | Australia . |
| 404668 | 6/1967 | Australia . |
| 409379 | 5/1968 | Australia . |
| 425206 | 1/1969 | Australia . |
| 53-58977 | 5/1978 | Japan | 210/640 |
| 53-92373 | 8/1978 | Japan | 210/640 |

Primary Examiner—Frank Sever
Attorney, Agent, or Firm—Hale and Dorr

[57] ABSTRACT

A hydrophobic semi-permeable membrane process (e.g., using hydrophobic microporous hollow fibers) for the concentration of a dilute solution of low osmotic pressure by osmotic distillation (also known as membrane distillation or membrane evaporation), which is a separation process using as its driving force the difference in the osmotic pressure between two fluids (e.g., fruit juice and seawater) separated by a hydrophobic semi-permeable membrane to achieve a concentration of the fluid having the lower osmotic pressure (.e., fruit juice). When coupled with reverse osmosis means there is provided a method for recovery of solvent (e.g., potable water) from the process, e.g., desalination of seawater. A process is also provided to recover part of the energy available between the two fluids i.e., between two different potential energies, due to the difference in osmotic pressure between the two fluids.

8 Claims, 6 Drawing Sheets

METHOD OF PERFORMING OSMETIC DISTILLATION

TECHNICAL FIELD

The present invention relates to the concentration of a liquid by utilising the difference of osmotic pressure between two liquids, and to apparatus suitable therefore.

BACKGROUND ART

The application of reverse osmosis to the concentration of solutions, for example dilute food products, and to the production of potable water or water of reduced salts content from seawater has in many cases resulted in significant cost benefits when compared with the conventional evaporation and distillation processes respectively. Nevertheless, there is scope for a further substantial cost reduction by eliminating the fouling problem associated with hydrophilic reverse osmosis membranes. The wettability of these membranes provides for close contact with an adherence of foulants such as organic colourants, various inorganic salts, and suspended and colloidal matter. Fouling has in some cases been alleviated by precipitation and filtration pretreatment processes. However, this adds substantially to the cost of the overall process, thus reducing the attractiveness of the reverse osmosis technique.

Hydrophobic porous barriers (e.g. diffusion barriers, such as hydrophobic porous or microporous membranes) of various pore dimensions have been developed for various applications, e.g. for membrane distillation and artificial oxygenation.

Hydrophobic membranes are generally made from an hydrophobic polymer, e.g. polytetrafluoroethylene (TEFLON) or polypropylene, such as membranes produced under the name CELGARD.

Hydrophobic membranes can also be made from hydrophillic polymers which have been specially treated to have reticulation of fluorocarbon radicals at the surface of the polymer.

Hydrophobic membranes are widely used in the medical industry for artificial oxygenation of blood. Such artificial oxygenation units are discarded after use, and are readily available from hospitals after use.

Membrane distillation processes are known which rely on the temperature gradient between two solutions. However, an osmotic distillation process which relies on the difference in osmotic pressure between two solutions has not previously been described.

DISCLOSURE OF THE INVENTION

It is an object of this invention to provide a method of increasing the hydrophobicity of a porous barrier or membrane and to provide membranes prepared by said method.

It is a further object of this invention to provide a method of, and apparatus for, the concentration of a liquid by utilising the difference of osmotic pressure (i.e., osmotic pressure gradient) between two liquids.

It is another object of the present invention to recycle such membrane oxygenation units for use in a membrane separation process using as the driving force the difference of the osmotic pressure between two liquids to achieve a concentration of the liquid having the lower osmotic pressure, or to recover part of the energy available between the two different potential energies of the two different liquids due to the difference in osmotic pressure between the two liquids.

It is yet a further object of this invention to provide a method of, and apparatus for, the concentration of a dilute solution by an osmotic distillation process by the transfer of solvent from the dilute solution in a vapour state through a hydrophobic (non-wettable) porous barrier into a concentrated solution of higher osmotic pressure.

It is yet another object of this invention to provide a process for the fractionation of, or recovery of a solvent from, a solution by a combination of osmotic distillation and reverse osmosis processes.

These and other objects of the invention will be apparent from the following disclosure of the invention.

According to one aspect of the present invention there is provided a porous barrier or diffusion barrier for the concentration of a dilute solution of low osmotic pressure by osmotic distillation comprising an hydrophobic porous or microporous matrix wherein solvent from the dilute solution is transferred through the barrier from one side to the opposite side in a vapour state under the influence of an osmotic pressure gradient.

According to the invention a method of making such a diffusion barrier comprises chemical treatment of the porous matrix with an agent to increase the hydrophobicity or the non-wettable properties thereof.

According to another aspect of the present invention there is provided a method of osmotic distillation for the concentration of a first liquid of relatively low osmotic pressure by circulating said liquid on one side of a hydrophobic porous barrier or membrane whilst simultaneously circulating a second liquid of relatively high osmotic pressure on the opposite side of the barrier whereby solvent from said first liquid is transferred across the barrier in the vapour state to the second liquid resulting in the concentration of the first liquid.

According to a further aspect of the invention there is provided apparatus for the fractionation of a primary liquid of low osmotic concentration and recovery of the solvent therefrom, comprising:

(i) a porous barrier for osmotic distillation comprising an hydrophobic porous matrix wherein solvent from the primary liquid on one side of the porous barrier is transferred through the porous barrier in a vapour state to a second liquid of higher osmotic concentration on the opposite side of the porous barrier under this influence of an osmotic pressure gradient; and (ii) a diffusion barrier for reverse osmosis whereby the diluted second liquid from the previous step may subsequently be split up to reconstitute and recycle the second liquid and recover the solvent transferred from the primary liquid.

According to yet another aspect of the invention there is provided a method for recovery of a solvent (e.g. potable water) from a primary liquid of relatively low osmotic concentration (e.g. seawater), comprising:

(i) subjecting the primary liquid to osmotic distillation with a porous barrier which separates the primary liquid from a second liquid of higher osmotic concentration characterized in that said porous barrier comprises an hydrophobic porous matrix and wherein an osmotic pressure gradient exists between said primary and second liquids whereby solvent from the primary liquid on one side of the diffusion barrier is transferred through the porous barrier in a vapour state to the second liquid on the opposite side of the porous barrier; and (ii) further subjecting the diluted second liquid from the previous step to reverse osmosis by reverse osmosis means whereby the solvent (e.g. potable water) is recovered.

Osmotic distillation is a process by which dilute solutions such as seawater, fruit juices, milk and coffee may be concentrated by transfer of water in the vapour state and under the influence of an osmotic pressure gradient through a hydrophobic (non-wettable), non-fouling porous barrier or membrane into seawater or a concentrated brine (e.g. magnesium sulphate, $MgSO_4$ solution) which is free of fouling material. The latter solution may then be treated by reverse osmosis for reconcentration and recycling to the osmotic distillation unit and, in the case of seawater treatment, for the recovery of potable water. In this way the expected life of reverse osmosis membranes can be extended significantly.

BRIEF DESCRIPTION OF THE DRAWINGS

The invention will be further described with reference to the drawings, in which.

BEST MODE OF CARRYING OUT THE INVENTION

Figure 1:
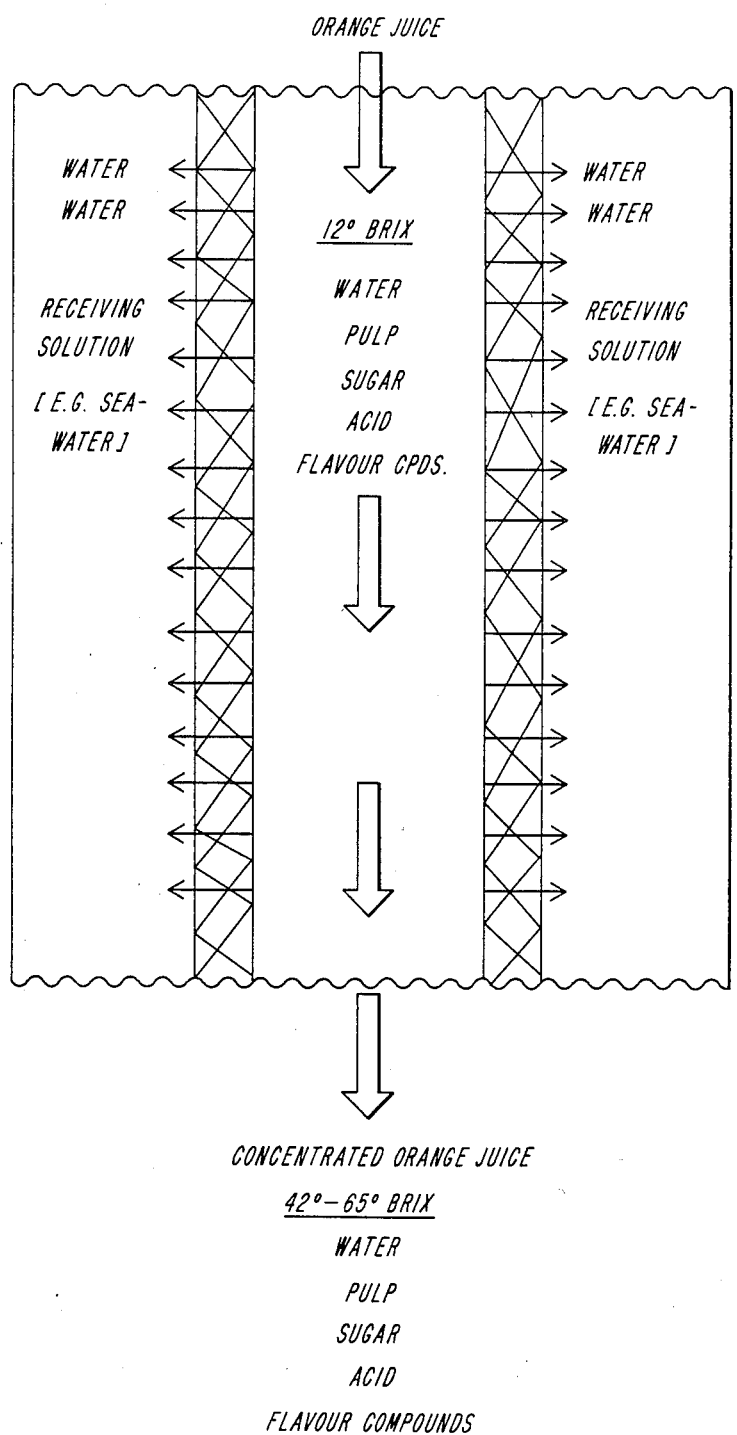
FIG. 1 schematically illustrates the concentration of fruit juice against seawater or concentrated brine by osmotic distillation.

In the drawings, FIG. 1 schematically illustrates the concentration of orange juice in a hollow fibre osmotic distillation unit wherein fresh orange juice at a concentration of 12° Brix is passed through the centre lumens of the bundle of hollow fibres in the osmotic distillation unit and seawater is passed countercurrent in the jacketed space of the osmotic distillation unit surrounding the bundle of hollow fibres. The osmotic-distillation unit comprises a cylindrical polycarbonate outer shell (diameter 100 mm, length 300 mm) with conical entry (top) and exit (bottom) chambers for the orange juice being concentrated. The entry and exit chambers are linked by ca. 62,000 hydrophobic polypropylene hollow fibre membranes (inside diameter 200 $\mu$m, wall thickness 25 $\mu$m, effective length 140 mm, average pore diameter 700 A, porosity 50 percent, total area 5.4 $m^2$) which are sealed together at both ends in a polyurethane resin (potting compound) so that they are contained in a jacket with entry and exit ports. Filtered seawater containing two suspended or colloidal material is pumped through this jacket approximately countercurrent to the internal flow.

The pure orange juice pumped through the osmotic distillation tube under low pressure becomes concentrated as it passes through the hollow fibres due to a transfer of water across the fibre walls into the seawater. The driving force for this transfer is the combined effect of a vapour pressure (or osmotic) gradient and a temperature gradient, brought about by an elevation of the vapour pressure of the orange juice by gentle heating before it enters the tube, and a depressed seawater vapour pressure by virtue of its relatively high osmotic pressure. The hydrophobicity of the membrane prevents transfer of liquid water and the fouling problems associated with hydrophilic membranes.

Figures 2, 3:
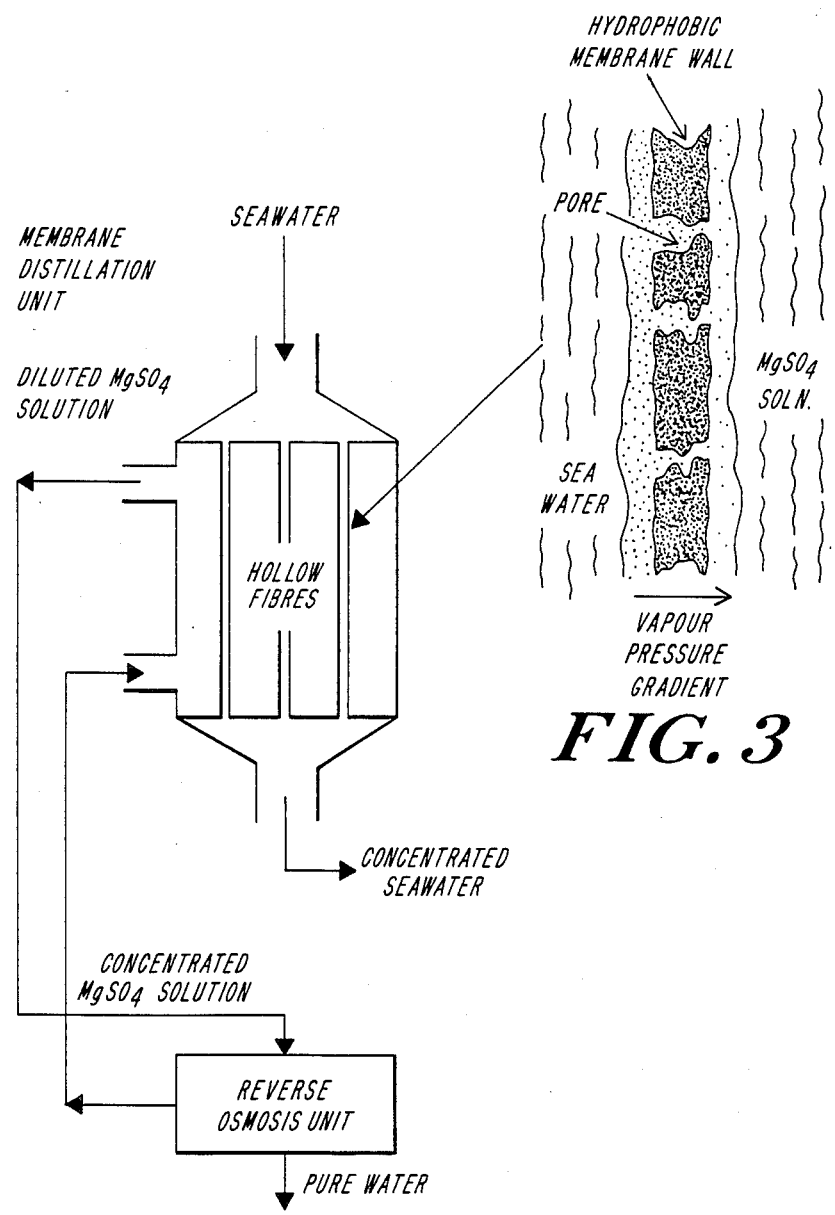
FIG. 2 schematically illustrates apparatus according to the invention wherein a osmotic distillation tube is coupled to a reverse osmosis unit for use in e.g. desalination—i.e., the production of potable wter of high purity from brackish water or seawater.
FIG. 3 is an enlarged view of the membrane wall of the osmotic distillation apparatus of FIG. 2, schematically illustrating that one of the main driving forces for the transfer of water from the seawater across the membrane wall and into the $MgSO_4$ solution is a vapour pressure gradient generated by an osmotic pressure gradient.

FIG. 2 shows the coupling of a osmotic distillation tube and reverse osmosis unit suitable for desalination of seawater or brackish water.

A suitable osmotic distillation tube comprises a cylindrical polycarbonate outer shell (diameter 100 mm, length 300 mm) with conical entry (top) and exit (bottom) chambers for the solution being concentrated. The entry and exit chambers are linked by ca. 62,000 hydrophobic polypropylene hollow fibre membranes (inside diameter 200 $\mu$m, wall thickness 25 $\mu$m, effective length 140 mm, average pore diameter 700 A, porosity 50 percent, total area 5.4 $m^2$) which are sealed together at both ends in a polyurethane resin (potting compound) so that they are contained in a jacket with entry and exit ports. A concentrated brine solution (e.g. magnesium sulphate, $MgSO_4$) containing no suspended or colloidal material is pumped through this jacket approximately countercurrent to the internal flow.

Normal (dilute) seawater pumped through the osmotic distillation tube under low pressure becomes concentrated as it passes through the hollow fibres due to a transfer of water across the fibre walls into the $MgSO_4$ solution. The driving force for this transfer is a vapour pressure gradient, brought about by an elevation of the vapour pressure of the dilute solution by heating before it enters the tube, and a depressed $MgSo_4$ solution vapour pressure by virtue of its high osmotic pressure. The hydrophobicity of the membrane prevents transfer of liquid water and the fouling problems associated with hydrophilic membranes.

The diluted $MgSO_4$ solution is pumped to the reverse osmosis (R.O.) unit where potable water is extracted using a hollow fibre R.O. membranes. The test apparatus has provision for two R.O. membrane modules, each of which contains nominally ca. 1300 hollow fibres (effective length 760 mm, total area per module 0.9 m$^2$). $MgSO_4$ was chosen for the brine solution because of its high rejection by the reverse osmosis membrane.

FIG. 3 schematically illustrates that the main driving forces for the transfer of water from the seawater (relatively low osmotic pressure) across the membrane wall and into the $MgSO_4$ solution (relatively high osmotic pressure) is a vapour pressure gradient. Combined with the effect of the temperature gradient between the two solutions there is provided the means for substantially increasing the flux of water by the process of osmotic distillation.

The osmotic evaporation unit produces large fluxes at high $MgSO_4$ concentrations (where the $MgSO_4$ stream is hydrated) and at high temperature differences of the $MgSO_4$ stream and seawater stream.

The reverse osmosis unit performs best at low $MgSO_4$ concentration so in coupling the two units an optimisation is made to yield high flux and low $MgSO_4$ concentrations in the $H_2O$ permeate.

Optimisation studies on the conditions of operation were carried out on both the osmotic distillation and reverse osmosis systems in order to effect an efficient coupling of the two units. Experiments were designed to ascertain the set of operating conditions which would allow the maximum yield of potable water from seawater.

In the experimental apparatus comprising a Syrinx Research 4-tube membrane evaporation unit coupled with a suitable 2-tube reverse osmosis unit, the reverse osmosis flux was found to increase linearly with feed pressure up to the maximum safe operating pressure tested of 4130 kPa (40.8 atm or 600 p.s.i). All testing was carried out at this pressure.

Figure 4:
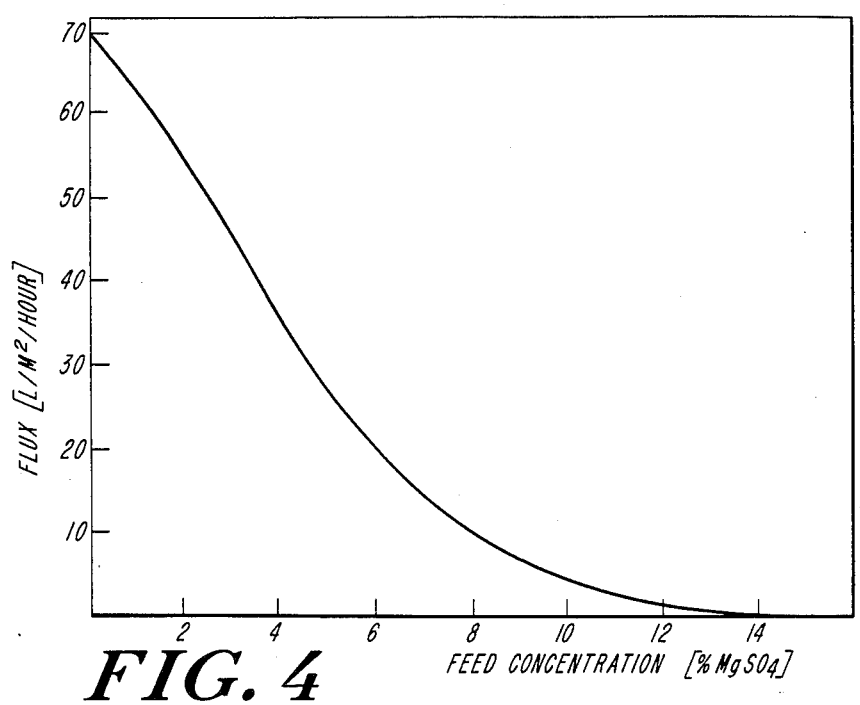
FIG. 4 is a graph illustrating the reverse osmosis flux versus $MgSO_4$ concentration at an operating pressure of 4130 kPa (40.8 atm) of apparatus of the type illustrated in FIG. 2.

FIG. 4 illustrates the reverse osmosis (R.O.) flux versus $MgSO_4$ concentration and shows that significant fluxes cannot be obtained at the pressure used with solutions of $MgSO_4$ concentrations greater than about 14 percent. Rejection (or retention) of the $MgSO_4$ by the R.O. membrane decreases as its concentration increases.

These results indicate for this embodiment that for maximum flux and $MgSO_4$ rejection, the R.O. unit should be operated at 4130 kPa using the minimum possible concentration of $MgSO_4$. However, the actual concentration used in the coupled system will be largely dependent on the concentration required to give an acceptable osmotic distillation flux.

In order to determine some basic operating characteristics of the osmotic distillation process and to more fully understand the behaviour of seawater in this process, the initial series of tests involved passing distilled water rather than seawater through the hollow fibre membranes.

(a) $MgSO_4$ solution—distilled water system.

Figure 5:
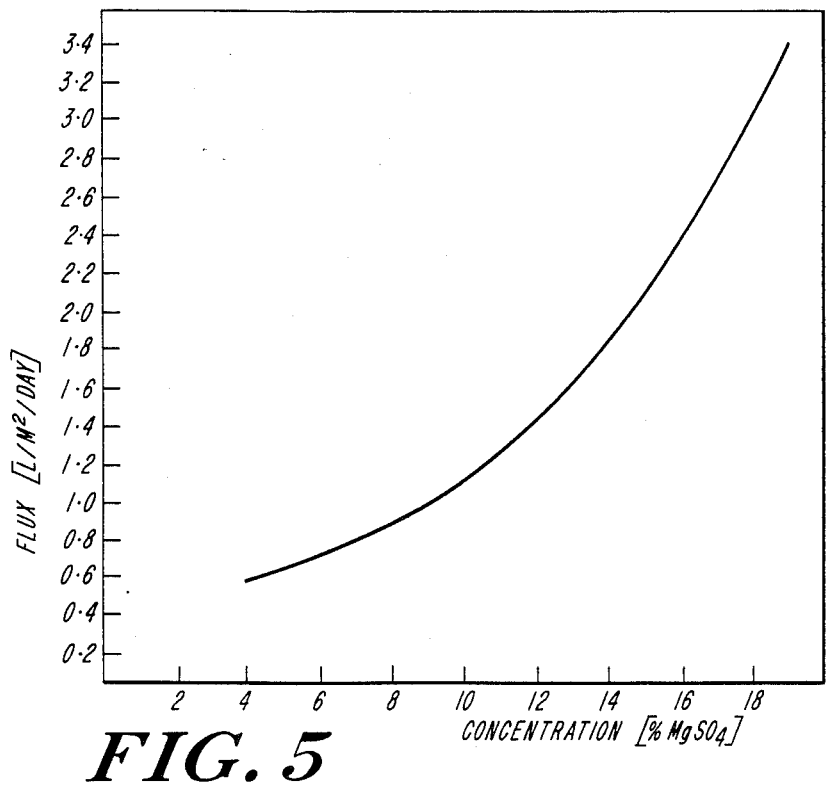
FIG. 5 is a graph illustrating the osmotic distillation flux versus $MgSO_4$ concentration for a distilled water/$MgSO_4$ system (at 30 kPa water back pressure).

Referring to FIG. 5, it is seen that osmotic distillation flux increases exponentially with increasing $MgSO_4$ concentration. This is presumably due to increased lowering of the water vapour pressure on the $MgSO_4$ solution side of the membrane with a resulting increase in water vapour pressure gradient across the membrane.

Period analysis of the outlet water stream showed that there was no leakage of $MgSO_4$ across the membrane, thus confirming the hydrophobicity of the latter.

Figure 6:
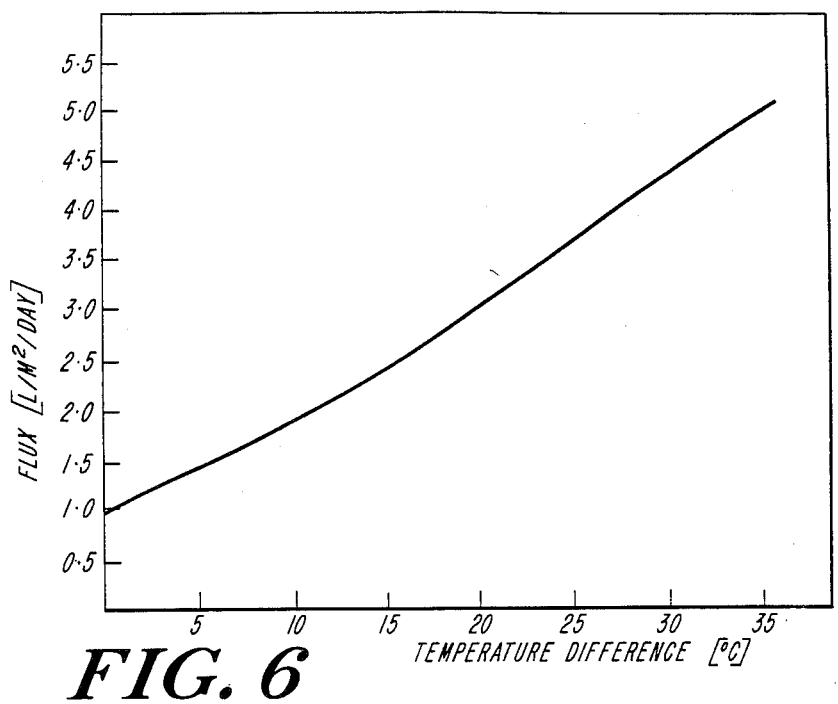
FIG. 6 is a graph illustrating the osmotic distillation flux versus the temperature difference between the temperature of the inlet distilled water and the temperature of the inlet $MgSO_4$ solution (at 30 kPa water back pressure).

FIG. 6 illustrates flux versus difference between inlet water temperature and inlet $MgSO_4$ solution temperature. The observed increase in flux with increasing temperature gradient is a consequence of the enhanced water vapour pressure on the water side of the membrane relative to that on the $MgSO_4$ solution side.

(b) $MgSO_4$ solution—seawater system

Figure 7:
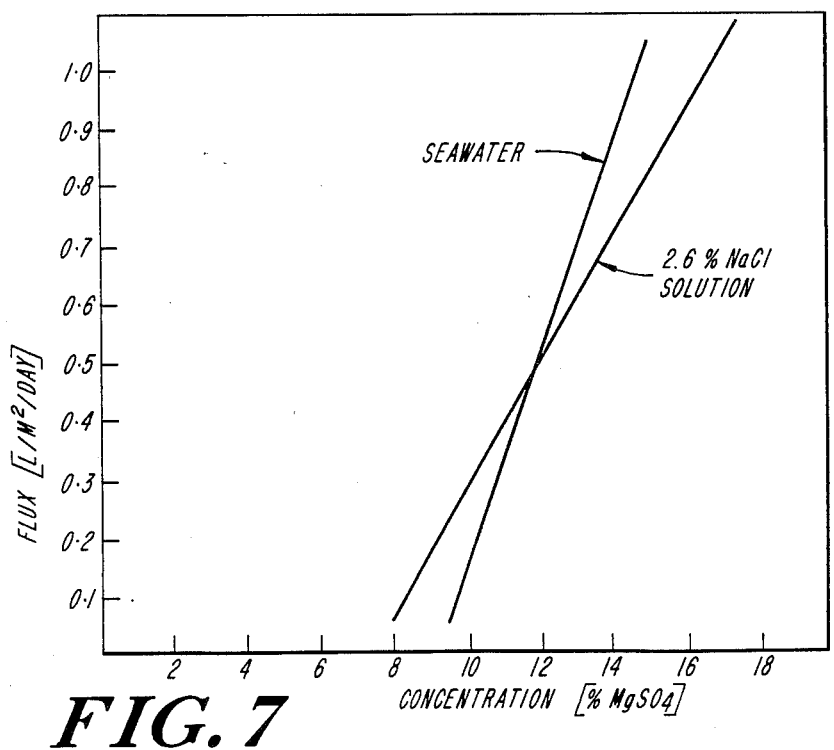
FIG. 7 is a graph illustrating the osmotic distillation flux versus $MgSO_4$ concentration for a seawater/$MgSO_4$ system (at 30 kPa seawater back pressure).

FIG. 7 illustrates flux versus $MgSO_4$ concentration. As in the case of distilled water there is an increase in flux with increasing $MgSO_4$ concentration. However, the seawater fluxes are considerably less than those for distilled water at the same $MgSO_4$ concentrations due to the high osmotic pressure of the seawater. Indeed, no mass transfer from seawater was observed for $MgSO_4$ concentrations below 9 to 10 percent.

The latter observation is consistent with the known osmotic pressures for $MgSO_4$ and NaCl solutions. As shown in FIG. 7 the seawater tested behaves in a similar way to a 2.6 percent NaCl solution. A 2.6 percent (0.44 molar) NaCl solution has an osmotic pressure (ca. 19 atm) equivalent to that of a 0.78 molar (9.4 percent) $MgSO_4$ solution of 25° C. Therefore, in the absence of a temperature gradient a vapour pressure gradient across the membrane will only exist if the $MgSO_4$ concentration exceeds 9.4 percent.

Figure 8:
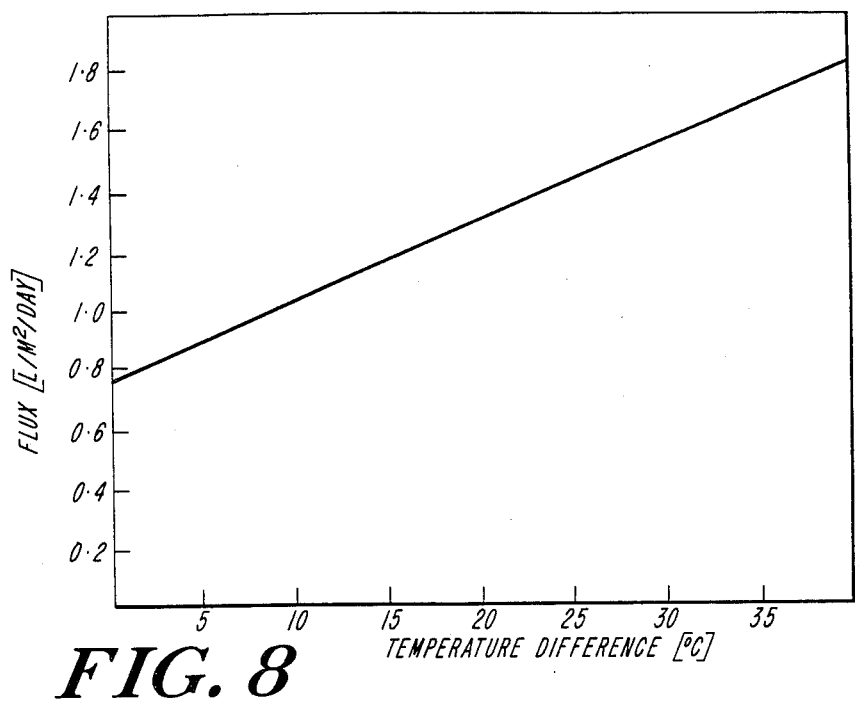
FIG. 8 is a graph illustrating the osmotic distillation flux versus the temperature difference between the temperature of the inlet seawater and the temperature of the inlet $MgSO_4$ solution (at 30 kPa seawater back pressure).

FIG. 8 illustrates flux versus difference between inlet seawater temperature and inlet $MgSO_4$ solution temperature. It is clear from FIG. 8 that there is an obvious trend towards higher fluxes with increasing temperature gradient. For a $MgSO_4$ concentration of 12 percent, a flux of ca. 0.5 liters per square meter per day is observed in the absence of a temperature gradient (FIG. 7). However, FIG. 8 shows that this flux can be significantly increased by employing a temperature gradient of 30° to 35° C.

Figure 9:
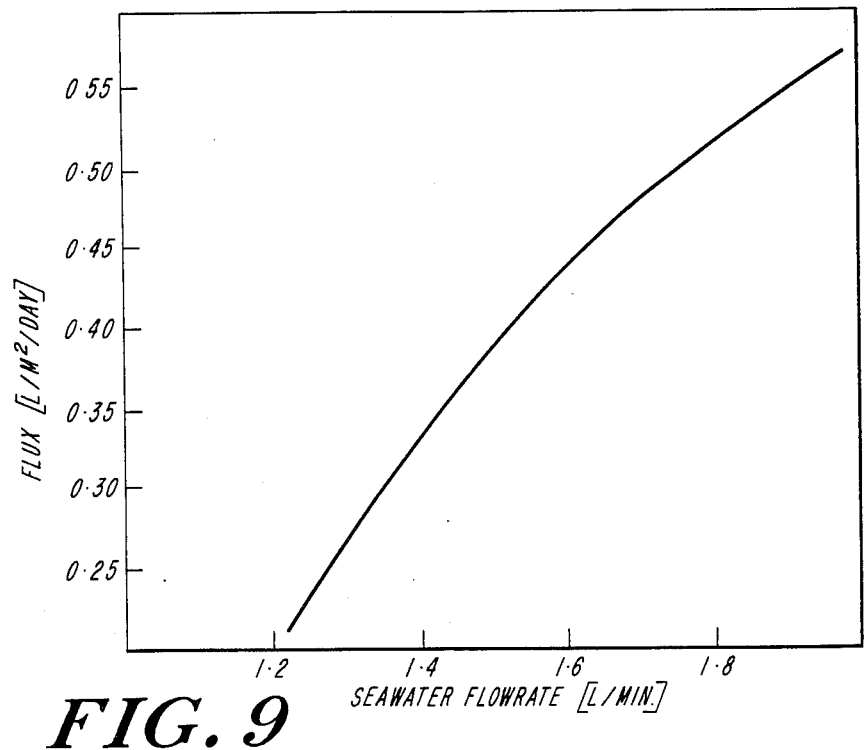
FIG. 9 is a graph illustrating the osmotic distillation flux versus seawater flow rate (14% $MgSO_4$, 40 kPa seawater back pressure, 0.71 l/min $MgSO_4$).

FIG. 9 illustrates flux versus seawater flow rate. For a $MgSO_4$ solution flow rate of 0.71 liter per minute, flux increases with increasing seawater flow rate. This is presumably due to more rapid replacement of the seawater foundary layer in which the salt concentration increases as vapour transfer occurs. A build of salt in the boundary layer would cause a localised increase in osmotic pressure and hence a decrease in vapour pressure gradient.

Figure 10:
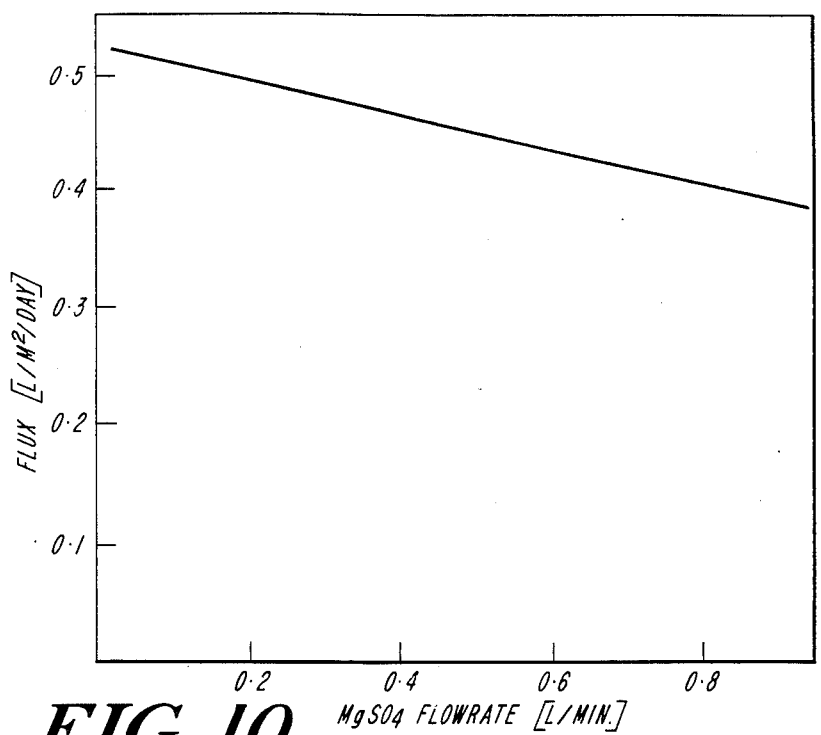
FIG. 10 is a graph illustrating the osmotic distillation flux versus $MgSO_4$ solution flow rate (14% $MgSO_4$, 40 kPa seawater back pressure, 1.36 l/min seawater flow rate).

FIG. 10 illustrates flux versus $MgSO_4$ solution flow rate. For a seawater flow rate of 1.36 liters per minute, flux decreases slightly with increasing $MgSO_4$ solution flow rate. As in the case of increasing seawater flow rate above, this presumably causes more rapid replacement of the boundary layer, this time on the $MgSO_4$ solution side of the membrane. A build up of $MgSO_4$ in the boundary layer and hence an increase in osmotic pressure is beneficial in this case since the vapour pressure gradient is increased.

The results of the optimisation studies suggest that the conditions for operation of the osmotic distillation unit should be selected on the basis of the following considerations:

(1) The seawater back pressure should be at least 30 kPa.
(2) The existence of a temperature gradient across the membrane is usually favourable. When a source of heat is readily available, it can be utilized in the process of the present invention since the presence of a temperature gradient can be a favourable factor in increasing membrane flux. In respect of the particular embodiment herein described the manufacturers of the membrane have specified an upper temperature limit of ca. 75° C. and hence a seawater inlet temperature of ca. 70° C. and ambient MgSO$_4$ solution temperature are recommended.

(3) The seawater flow rate should be as large and the MgSO$_4$ solution flow rate as small as practicable. In this regard it should be remembered that the extent to which the MgSO$_4$ solution stream is heated in the tube increases as its flow rate decreases. Excessive heating of this stream reduces the average temperature gradient across the membrane and necessitates more effecitve cooling before reaching the reverse osmosis unit. Having regard for these factors, a seawater flow rate of ca. 2 liters per minute and MgSO$_4$ solution flow rate of ca. 0.5 liters per minute are recommended.

(4) The MgSO$_4$ concentration of greater than ca. 9 to 10 percent is required. However, the most suitable concentration must be determined by experiment employing the optimum conditions of water back pressure, temperature gradient and flow rates discussed above. Also the capacity of the reverse osmosis unit to remove water from the MgSO$_4$ solution at the same rate as it is removed from the seawater by the osmotic distillation unit must be taken into account when determining this concentration.

Figure 11:
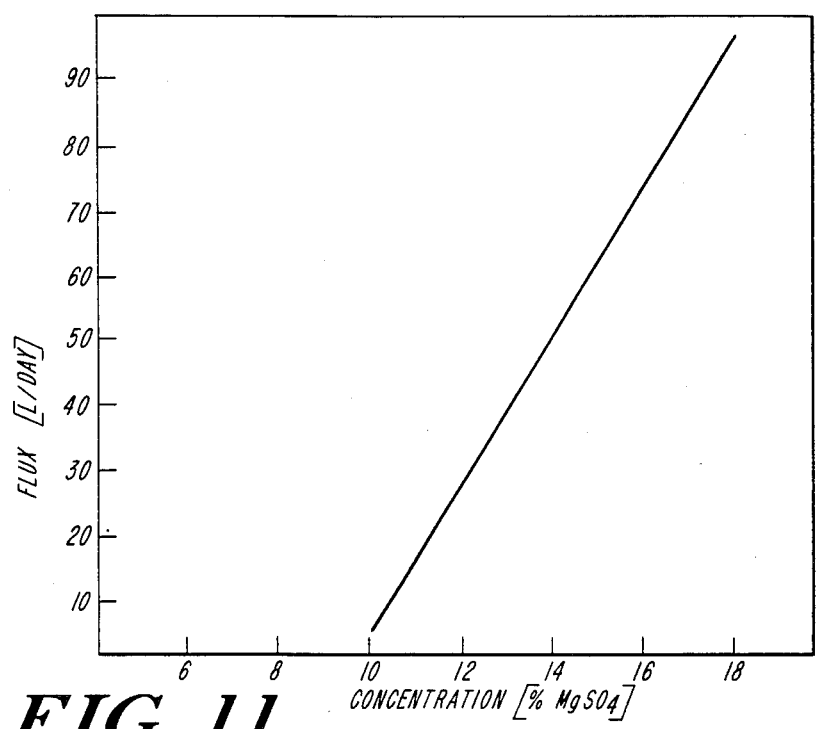
FIG. 11 is a graph illustrating the relationship between the osmotic distillation flux and $MgSO_4$ concentration under preferred conditions for this example.

The relationship between flux and MgSO$_4$ solution concentration under optimum conditions is shown in FIG. 11. In this case the flux scale is given in liters per day for a 4-tube unit constructed by Syrinx Research for coupling with the reverse osmosis unit.

FIGS. 4 and 10 show that a 14 percent MgSO$_4$ solution gives a osmotic distillation flux of 50 liters per day and that the diluted MgSO$_4$ solution can be reconcentrated by the reverse osmosis unit provided that both of the membrane modules are in operation. At a concentration of 14 percent MgSO$_4$, the combined flux of the two reverse osmosis membrane modules is ca. 2.5 liters per square meter per hour (55 liters per day). FIG. 13 shows that considerably higher osmotic distillation fluxes can be achieved at higher MgSO$_4$ concentrations (e.g. ca. 90 liters per day at 18 percent MgSO$_4$). However, the particular membrane modules used in this particular embodiment are incapable of withstanding the high pressure required to overcome the osmotic pressure of such solutions.

In summary the results show that the pressure difference across the membrane is the main contributing variable determining the flux. The pressure difference is due to osmotic pressure differences and temperature differences across the membrane.

The experimental results show that MgSO$_4$ concentration and temperatures of the MgSO$_4$ stream and seawater stream are very important variables in govering the flux. This is because the MgSO$_4$ concentration is related directly to the osmotic pressure of the stream at a given temperature. Another important variable is the seawater flowrate.

The osmotic pressure of a liquid is linked to the vapour pressure at equilibrium by the relationship;

$$\pi V^1 = RT \ln \frac{P^o}{P} \tag{1}$$

where:
- $\pi$ = osmotic pressure
- $V_1$ = partial molar volume of the solution
- R = Universal Gas Constant
- T = Absolute Temperature
- P and $P^o$ = the vapour pressures of the two different states of the liquid (i.e. with and without solute)

This relationship is applicable provided that the vapour behaves as an ideal gas and the solution is incompressible.

If the solution under consideration behaves ideally then Raoult's Law is obeyed and $P/P^o = 1 - x_2$ where $x_2$ is the mole fraction of the solute.

$$x_2 = \frac{n_2}{n_1 + n_2}$$

where
- n = number of molecules in a given volume
- $n_1$ = number of moles of solvent.
- $n_2$ = number of moles of solute.

For this reason, any solute lowers the vapour pressure of a solvent, and there is at the gas interface between two liquids having different osmotic pressures a transfer of solvent from the lower osmotic pressure liquid to the higher osmotic pressure liquid.

This process can be illustrated using an artificial oxygenator of the following type developed by Terumo Corporation of Japan:

Type: TERUMO CAPIOX II 16—Hollow Fibre Oxygenator with Integrated Heat Exchanger
Code No.: CX∗MP16H
Effective Surface Area: 1.6m$^2$
Maximum Blood Flow Rate: 2 l/min.
Maximum Operating Pressure: 1,000 mm Hg.

The hollow fibre membranes are made from polypropylene, and have pore dimensions of 700 Angstrom. This equipment is normally used for artificial oxygenation of blood, with blood being circulated through the hollow fibres and oxygen gas being circulated in the jacket surrounding the hollow fibres, i.e. on the outside of the hollow fibres. In this case there is transfer of oxygen gas from the outside of the hollow fibres to the blood circulating inside the hollow fibres.

For this type of medical application, such hollow fibre oxygenator units are normally disposed of after a single use. However, according to the teaching of one aspect of the present invention it is possible to recycle such hollow fibre oxygenator units for different applications.

Taking such a used oxygenator unit, and cleaning the unit with suitable cleaning agents, e.g. PYRONEG, drying the unit and increasing the hydrophobicity of the fibre by chemical treatment, we obtain a unit which can be used for osmotic concentration.

The chemical treatment of the hollow fibres to increase the hydrophobicity is desirable to maintain the long-term working properties of the unit in osmotic concentration processes.

An example of the chemical treatment of the hollow fibres is given as follows:

1. Pre-irradiation of the hollow fibre unit filled with pure nitrogen, using a Cobalt 60 source at a radiation level of 2 megarad.
2. Filling the unit with a fluorocarbon gas of the Freon series.
3. Rinsing with distilled water.

If in such a unit pure water is circulated inside the hollow fibres, and seawater is circulated in the jacketed space surrounding the hollow fibres, the pure water would evaporate inside the pores and is condensed on the seawater side, with a flux of approximately 12 l/m²/day at room temperature.

In the same manner, if the pure water stream is replaced by any liquid having an osmotic pressure lower than the osmotic pressure of the seawater, then the said liquid will be concentrated as a result of the continuous evaporation of its water content, and the condensation thereof on the seawater side.

By reference to equation (1), above, the flux of solvent through the system is proportional to the difference $P-P^o$ which is in relation to the difference in osmotic pressure $\pi$. The flux is also influenced by both the thermic gradient and the pressure gradient between the two solutions. For example, using the same membrane, if we circulate a solution of 200 grams/liter of NaCl in water outside the fibres, and a coloured solution of 1% methylene blue in distilled water inside the fibres, and using an inner pressure for this solution of 100 kPa and without applying any pressure to the sodium chloride solution, and using a temperature difference between the two solutions of 20° C. (e.g. 40° C. for water+methylene blue and 20° C. for the sodium chloride solution), the flux obtained is approximately 85 l/m²/day.

The present invention will be further described with reference to the following non-limiting disclosure of some of the other possible applications of the invention.

Concentration of Liquids of Relatively Low Osmotic Pressure Using Seawater

Examples of liquids which may be concentrated by this method include foodstuffs such as mil, whey, coffee, tea, fruit and vegetable juices, and sugar cane juice. Other examples include applications in the pharmaceutical and fine chemicals industries where heat labile products can be concentrated by osmotic distillation. The liquid to be concentrated is circulated on one side of the membrane and seawater is circulated on the other side. An increase of flux is achieved by an increase of static pressure of the liquid to be concentrated, and preferably an increase of the temperature thereof compared to the temperature of seawater, for example by the use of recovered waste heat from other sources in the factory. In this regard, most artificial oxygenator units are already equipped with some form of heat exchanger which can be used for this purpose.

Osmotic Concentration Against a Salt Solution

Concentration of liquids of relatively low osmotic pressure, such as milk, whey, fruit and vegetable juices and cane juice, as described above, can be obtained by a process using the difference in osmotic pressure between such solutions and a highly concentrated solution of a salt e.g. NaCl. In this case, the concentration of the NaCl solution is maintained by one of the following methods:

(i) By use of a solar pond where the solar evaporation of the water maintains the high concentration of the salt necessary to maintain the high osmotic gradient which exists between the solution to be concentrated and the concentrated salt solution.

In this regard, the process provides a way to recover and to utilize solar energy for concentration of liquids. For example, whilst it is not possible to use solar energy directly to concentrate milk it can be used in this process to maintain the concentration of a salt solution which in turn is used in the osmotic concentration of milk.

In this regard the technology is of great importance for countries like Israel and Jordan where there is a high production of fruit juice and a readily available supply of concentrated salt water, e.g. the Dead Sea. In this regard the invention provides a way to utilize the high potential energy of the concentrated salt water for industrial application, in an area where the alternative sources of energy are relatively very expensive, particularly where heating applications are required, such as for the concentration of fruit juices.

(ii) The use of a reverse osmosis unit to maintain the concentration of salt of the high osmotic pressure solution by elimination of water using a pressure-driven process. This application is of particular importance since reverse osmosis cannot be used directly because of the problems of scaling and fouling of reverse osmosis membranes if used for the direct concentration of a large number of liquids, e.g. milk. In this application, the milk or fruit juice is concentrated by osmotic concentration through the membrane without scaling (the membrane being hydrophobic does not come into contact with the liquid), without heat dissipation (which is important, for example for pre-concentration of a solution before leophilization, e.g. for the production of instant coffee), in a circuit which is totally insulated from the outside, being separated by a gas phase. On the other hand, the reverse osmosis unit has only to maintain the salt concentration of a pure solution, e.g. $MgSO_4$ in water which does not generate any scaling, and wherein the membrane life for the reverse osmosis membrane under these conditions could be of the order of up to about 10 years. Due to the fact that reverse osmosis membranes do not give 100% rejection, the choice of a high rejecting membrane, e.g. 99.5%, is important, the loss of salt being compensated by the small addition required.

Production and Recovery of Energy

The invention can also be used to produce and to recover energy, part of the energy potential which exists between two streams, one of high osmotic pressure e.g. seawater, brines etc., and a stream of low osmotic pressure e.g. fresh water from rivers, including brackish water, and also water from sewerage etc. In all of these applications, the transfer of water from the low osmotic pressure side to the high osmotic pressure side is used to pressurize the high osmotic pressure liquid, and the energy is recovered by any classical means using two liquids of different pressure e.g. high pressure turbines, piezoelectric cells, using an oscillating pressure.

Use as a Complement of Reverse Osmosis

A further aspect of the invention is the use of the process as a complement of reverse osmosis processes to produce pure water from seawater or brackish water.

Most reverse osmosis membranes have rejection coefficients of the order of 95% for NaCl (when membranes are designed to have high specific flux) but have high rejection characteristics, for example 99.7%, for other salts (e.g. magnesium sulphate).

A further use of the invention is to use a highly concentrated solution of a salt, which is easily rejected by the reverse osmosis membrane, as the high osmotic pressure solution, and to use seawater (or brackish water) as the low osmotic pressure solution (relative to the other solution) and to extract water therefrom.

In this case, without pre-treatment of the seawater stream, pure water is produced by reverse osmosis of the high pressure solution. In this regard the invention provides an efficient desalination process for the recovery of potable water or water of substantially reduced salts content from seawater or brackish water. The recovered water can be supplemented where required by the addition of salts, minerals and/or other additives.

Further, by a selective choice of salts for the concentrated salt solution it is possible to use more open membranes to concentrate and recycle the diluted high osmotic pressure solution and/or to recover the water therefrom. For example, selecting a salt which in solution has a large anion and a small cation (e.g. acotinic acid, which has a large anion and a free acid function) allows the choice of a more open membrane, but having a pore size sufficient to reject the large anion. If this membrane is positively charged by sulphochlorination and amination there is provided a porous membrane which rejects $H^+$ ions by the charge effect and rejects anions by size.

Similarly where the solution contains a base comprising a large cation and a small anion (e.g. $OH^-$) the porous membrane is chosen such that the large cation is rejected by size and wherein the OH can be rejected by negatively charging the membrane.

Characteristics of the Membrane

1. To maintain the hydrophobicity of the membrane, pores no greater than about 5 microns are required. High specific porosity; the flux/m$^2$ being proportional to the surface area of the pore.
2. The membrane is as thin as possible, preferably below 50 microns thickness. Because of the difference in vapour pressure established across the membrane the flux is directly related to the length of the pore where the pressure difference is established.
3. The membrane should be totally hydrophobic to maintain a gas lock between the two liquids, otherwise diffusion of salts will occur and this is undesirable. To avoid air locks, and to ensure that the pores are filled only by the solvent in gaseous form, the unit is initially filled with a gas which is highly soluble in the solvent, e.g. $CO_2$.
   To maintain a high degree of hydrophobicity, a surface treatment of the membrane is usually required to ensure longevity, even when the membrane comprises an hydrophobic polymer.
4. The membrane is required to have sufficient chemical/thermic resistance to the liquids being treated and under the conditions of treatment—i.e. the membrane has to be used below the glass transition point of the polymer of which the membrane is comprised.
5. The cleaning agents must be carefully selected in order to avoid wetting of the polymer. For example, ethyl alcohol will wet polypropylene and will destroy the hydrophobicity.
6. The pore size of the membrane has to be sufficiently small compared to the bubble point of the solution being treated. Further the pore size has to be sufficiently small to give a bubble point pressure above the pressure used in the process.

Although the invention has been described above with reference to examples and to preferred embodiments, it will be appreciated that the invention may be embodied in other forms or carried out in other ways without departing from the spirit or essential characteristics thereof. The above description is therefore to be considered as in all respects, illustrative and not restrictive, and all changes which come within the meaning and range of equivalency are intended to be embraced therein.

I claim:

1. A method of osmotic distillation for the concentration of a first fluid of relatively low osmotic pressure comprising: circulating said fluid on one side of a hydrophobic porous barrier; simultaneously circulating a second fluid of a relatively high osmotic pressure on the opposite side of the porous barrier; solvent from said first fluid being transferred across the porous barrier in the vapor state substantially solely under the influence of an osmotic pressure gradient to the second fluid resulting in concentration of the first fluid.

2. A method according to claim 1, wherein the porous barrier comprises a hollow fiber tube unit, wherein said first fluid is circulated through inner channels or lumens of a bundle of hollow fibers and wherein the second fluid is circulated around the bundle of hollow fibers, whereby solvent from said first fluid is transferred across a microporous matrix structure in the walls of the hollow fibers under the influence of an osmotic pressure gradient.

3. A method according to claim 2, wherein the second fluid circulating around the bundle of fibers is seawater or a brine solution.

4. A method according to claim 2, wherein the second fluid is taken from a solar pond.

5. A method according to claim 1, wherein the diluted second fluid is subsequently subjected to reverse osmosis treatment to separate the solvent and to concentrate the second fluid suitable for recycling.

6. A method for recovery of a solvent from a primary fluid of relatively low osmotic concentration, comprising:
   (i) subjecting the primary fluid to osmotic distillation with a porous barrier which separates the primary fluid from a second fluid of higher osmotic concentration characterized in that said porous barrier comprises a hydrophobic porous matrix and wherein an osmotic pressure gradient exists between said primary and second fluids sufficient that solvent from the primary fluid on one side of the porous barrier is transferred substantially solely under the influence of said gradient through the porous barrier in a vapour state to the second fluid on the opposite side of the porous barrier; and
   (ii) further subjecting the diluted second fluid from the previous step to reverse osmosis by reverse osmosis means whereby the solvent is separated and the second fluid is recovered and concentrated suitable for recycling.

7. A method for desalination of seawater, comprising:
   (i) subjecting the seawater to osmotic distillation against a salt solution of higher osmotic pressure than the seawater, wherein the seawater and the salt solution are separated by a hydrophobic porous barrier, sufficient that water from the seawater is transferred through the porous barrier in a vapour state substantially solely under the influence of an osmotic pressure gradient and into the salt solution on the opposite side of the porous barrier thereby diluting the salt solution; and (ii) subjecting the diluted salt solution to reverse osmosis treatment whereby water is separated from the salt solution, and the salt solution is concentrated suitable for recycling.

8. An osmotic distillation apparatus for concentrating a first fluid of relatively low osmotic pressure comprising:

a hydrophobic porous barrier and means for circulating said first fluid on one side of said hydrophobic porous barrier;

means for simultaneously circulating a second fluid of a relatively high osmotic pressure on the side of said porous barrier opposite the side on which the first fluid circulates including means for causing solvent from said first fluid to be transferred across said porous barrier in a vapor state substantially solely under the influence of an osmotic pressure gradient to the second fluid resulting in concentration of the first fluid.

* * * * *